July 7, 1959 W. STUHRE 2,893,006

METHOD OF SECURING COMPONENTS TO A PRINTED WIRING PANEL

Original Filed July 20, 1955

INVENTOR.
WALTER STUHRE
BY
F. D. Pryor
ATTORNEY

United States Patent Office 2,893,006

Patented July 7, 1959

2,893,006

METHOD OF SECURING COMPONENTS TO A PRINTED WIRING PANEL

Walter Stuhre, Horsham, Pa., assignor to Philco Corporation, Philadelphia, Pa., a corporation of Pennsylvania Original application July 20, 1955, Serial No. 523,188. Divided and this application May 2, 1958, Serial No. 732,486

6 Claims. (Cl. 1—60)

The invention hereinafter described and claimed relates to a method of connecting electrical circuit components with the relatively flat, ribbon-like conductors which characterize circuits of the so-called "printed" type. Apparatus for making such connections has been described and claimed in the applicant's copending application Serial No. 523,188, filed July 20, 1955, and this is a division of the co-pending case.

In the fabrication of "printed" circuit devices it is necessary to affix components, by means of lead wires thereof, to a panel, prior to application of solder or the like. Such preliminary affixment has ordinarily been accomplished by a stapling operation, wherein stationary anvil surfaces guided the leads into positions adjacent their terminal connections on the printed panels.

Difficulties have been encountered in the ensuing manufacturing operations, based on such stapling methods, and also in the use of panels assembled by such methods. with such firmness as is desired for successful soldering, One problem was that the components were not affixed so that relative movements between components and panels occurred while the solder solidified. This resulted in solder joints which were mechanically weak and which provided inadequate and erratic electrical conductance.

It is a basic object of the present invention to provide a method of preliminary affixment which reduces or eliminates such difficulties. For this purpose the invention provides a crimping method in which lead elements are positively gripped and rotationally crimped so as to firmly affix the several parts to each other in such relationship and relative positioning as is desirable for soldering.

It was a further problem, encountered with the stapled connections of the prior art, that it was difficult to remove the components in cases where such became necessary, for instance in repair of the appliance. A further object and feature accordingly is to affix and solder the components to the panel so that they can later be more readily removed, when desired, than could the stapled-on and soldered components of the prior art. An added and partly related object and feature is to conduct the preliminary attaching operation so as to provide lead wire surfaces which cause solder to adhere more effectively than it did in prior soldered joints of the type considered herein. For these purposes the new method preferably includes the step of bending lead elements in a plurality of planes, as will be shown hereafter.

Still further objects and features of the new method, and the particular manner in which they have been attained, will be evident from the following detailed description, in the light of the attached drawing, in which.

Figure 4:
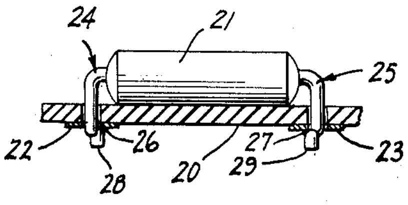
Figure 4 shows the parts indicated in Figure 3 in a view at right angles to that of said figure.
Figure 5:
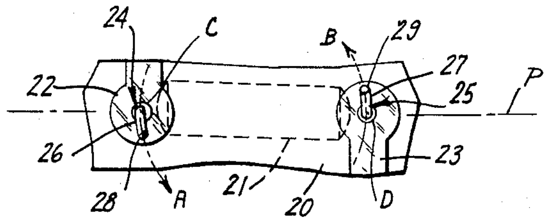
Figure 5 is a bottom view of the parts of Figure 4, also indicating the directions of certain motions carried out in the performance of the present method.
Figure 6:
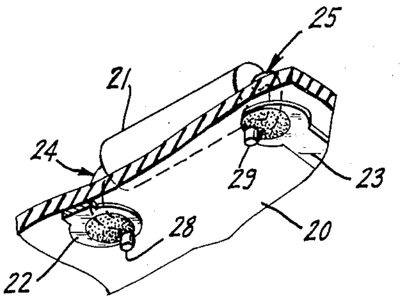
Figure 6 is a perspective bottom view of the parts of Figure 5.
Figure 7:
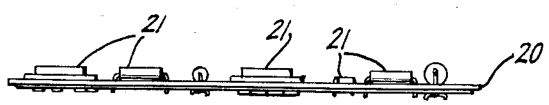
Figure 7 is a side elevation showing a "printed" circuit panel on a smaller scale, with components fixed in place by crimping in accordance with the invention.

Referring first to this last-mentioned Figure 7, it will be noted that the finished panel 20 has a plurality of components 21 secured to the top thereof. Lead wires extend through the panel and are crimped over against the lower side thereof. On said lower side, as best shown in Figures 5 and 6, there are provided terminals 22 of flat, ribbon-like conductor strips 23, for instance of the "printed" type. The lead wires 24, 25 of the components extend through such terminals, then along the said terminals at 26, 27 and then a short distance downwardly away from said terminals at 28, 29. Different views of this arrangement appear in Figures 3 and 4.

The invention provides a method of crimping the lead wires so as to provide an arrangement such as that shown at 24, 26, 28; to draw the components 21 firmly into their fixed positions against the top of the panel; to guard against accidental detachment, for instance when the panel is turned upside down for the spraying on of solder flux; and to provide for the other objects mentioned above. This method may for instance be carried out by means of the structures shown in Figures 1 and 2.

In the initial operation forming part of the present method, lead wires 24, 25 of a component 21 are inserted downwardly into holes, previously formed in panel 20; and the said wires are then engaged and crimped in particular ways, for which purpose they may further be lowered into aligned holes of a tool and anvil device 30, 31, the latter holes being shown at 33 and 36. The invention involves, as a further operation, the forming of bent or crimped lead wire portions 26, 27 along the underside of the panel 20, by wiping such portions in horizontal directions which are shown by arrows A and B in Figure 5. It will be noted that the said directions A and B are lateral of a plane P including component 21 and insertion holes C and D; and while being slightly arcuate because of the rotation of anvil 31 relative to panel 20, the said directions A and B are substantially at right angles to said plane.

The said plane P is shown as being vertically oriented and coinciding with the plane containing those portions of lead wires 24, 25 which lie above panel 20; and the direction of the illustrated crimping A, B of the lower lead wire portions 26, 27 is not only lateral of plane P, it occurs more particularly in a horizontal plane at right angles to plane P. This can be achieved for instance by using the device shown in Figures 1 and 2; it will be seen that anvil 31 moves horizontally, adjacent and below the horizontal panel 20 and relative to said panel. As a result of the operation as described, the crimped lead wire portions 26, 27 are substantially horizontal or flat, or their direction at least includes a substantial, horizontal component, as is best shown in Figure 3. By virtue of this form of crimping, the lead wires are pressed relatively firmly against a portion of the terminal 23; and by virtue of the laterally opposed directions A and B of such crimping, the crimping results in not only drawing lead wires down through holes C and D but in drawing the entire component securely against the top of panel 20.

For these reasons the present method is highly efficient in providing a securement of the component which in the ensuing operations not only resists and prevents accidental detachment of the component, for instance when the panel is turned upside down for spraying solder flux onto the printed conductors and terminals, but minimizes any tendency of the components to wobble or vibrate on the panel, during the soldering.

Figure 1:
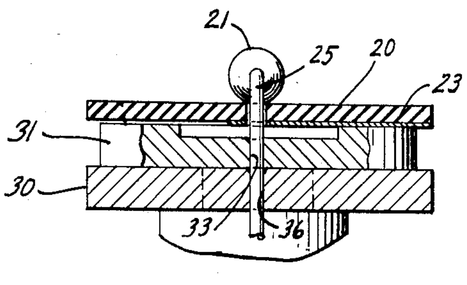
Figure 1 is a cross-sectional elevation of structure involved in carrying out the method of the present invention.
Figure 2:
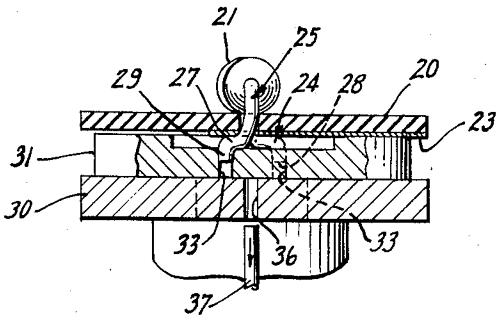
Figure 2 is a view generally similar to that of Figure 1, which, however shows the said structure in a different operative position.
Figure 3:
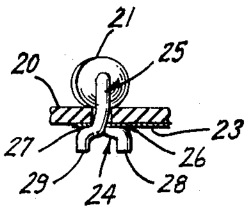
Figure 3 is a view similar to that of Figure 2 which however shows only the panel and the component.

Incident to the operation wherein the structure of Figure 1 moves into the position of Figure 2 the lower surface of anvil 31 slides over the upper surface of support plate 30, thereby applying a shearing action to lead wire 24, 25 in apertures 33, 36 and cutting off the lower portion 37 of said lead wire. Such lower portions can be discarded as indicated by Figure 2.

Incident to such motions and pursuant to the cutting off of portion 37 a short length of each lead wire 24, 25 is still within the vertical hold 33 of anvil 31, if such an anvil be used, and as the anvil continues to rotate and to progressively crimp the lead wire into a position containing the aforementioned horizontal portion 26 or 27, such operation results in not only drawing upper lead wire portions downwardly through holes in the panel, as mentioned, but in also drawing lowermost portions of the remaining lead wire upwardly through the holes 33 formed in the anvil. It is however preferred that said holes be dimensioned so that, at the end of the rotary motion, at least a short portion of each lead wire, shown at 28, 29, remain in said holes, as clearly indicated in Figure 2, thereby providing downwardly extending lead wire ends as best shown in Figure 6. More generally expressed, the method according to this invention preferably includes, bending lead portions 26, 27 into opposite horizontal directions lateral of plane P and bending terminal lead portions 28, 29 into vertical, downward directions.

The presence of downwardly extending lead wire ends 28, 29 during the ensuing soldering operation, has been found to improve that operation materially, as the said ends readily break the surface tension of the solder, for instance in dip-soldering, thereby greatly facilitating formation of the desired terminal joints. Furthermore the presence of the said downwardly extending wire ends 28, 29 simplifies servicing of the panel, as it becomes possible to locate individual lead wire ends promptly and to grip them firmly, if and when it is necessary to remove a component or to replace it.

It will accordingly be appreciated that the present method is broadly characterized by the steps of (1) applying a component against one side or face of a panel, with wires extending from the component through the panel and beyond the other side or face thereof and (2) crimping said wires (*a*) laterally (*b*) in opposite directions. The lateral crimping in opposite directions can evidently be performed in various ways other than those shown in Figures 1 and 2, for instance by hand. This operation is believed to be new over all methods hitherto employed in this art; and it has resulted in material gains as to consistency and economy of fabrication of printed circuit panels.

While only one way of performing the method has been illustrated, it will be appreciated that the invention may be refined and modified in various ways. It should therefore be understood that the invention is not to be limited in the interpretation thereof except by the scope of the following claims.

I claim:

1. In the securement of components to wiring terminals of printed wiring panels, the process comprising applying a component in position at the rear side of the panel with its lead wires projecting through holes in the panel to the face thereof in proximity to the respective printed terminals with which they are to be interconnected, and securing said lead wires in the desired positions by crimping the projecting portion of one of them laterally against its associated terminal and crimping the projecting portion of the other laterally in a different direction against its associated terminal, said crimping operations being accomplished by bending the projecting portions of said terminals by opposed wiping operations performed laterally against said portions.

2. In the securement of components in conductive relationship to wiring terminals of printed wiring panels, the process comprising applying a component in position at the rear side of the panel with its lead wires projecting through holes in the panel to the face thereof in proximity to the respective printed terminals with which they are to be interconnected, and securing said lead wires in the desired electrically conductive positions by crimping the projecting portion of one of them laterally against its associated terminal and crimping the projecting portion of the other laterally in the opposite direction against its associated terminal, said crimping operations being accomplished by bending the projecting portions of said terminals by opposed wiping operations performed laterally against said portion simultaneously.

3. In the securement of components in conductive relationship to wiring terminals of printed wiring panels, the process comprising applying a component in position at the rear side of the panel with its lead wires projecting through holes in the panel to the face thereof in proximity to the respective printed terminals with which they are to be interconnected, and securing said lead wires in the desired electrically conductive positions by crimping the projecting portion of one of them laterally against its associated terminal and crimping the projecting portion of the other laterally in the opposite direction against its associated terminal while bending the extremities of said crimped portions angularly away from said laterally bent portions.

4. In the securement of components in conductive relationship to wiring terminals of printed wiring panels, the process comprising applying a component in position at the rear side of the panel with its lead wires projecting through holes in the panel to the face thereof in proximity to the respective printed terminals with which they are to be interconnected, and securing said lead wires in the desired electrically conductive positions by crimping the projecting portion of one of them laterally against its associated terminal and crimping the projecting portion of the other laterally in the opposite direction against its associated terminal, said crimping operations being accomplished by bending the projecting portions of said terminals arcuately in opposite directions by opposed wiping operations performed laterally against said portions.

5. In the securement of components in conductive relationship to wiring terminals of printed wiring panels, the process comprising applying a component in position at the rear side of the panel with its lead wires projecting through holes in the panel to the face thereof in proximity to the respective printed terminals with which they are to be interconnected, and securing said lead wires in the desired electrically conductive positions by severing and removing undesired portions of the projecting portions thereof and crimping one of them laterally against its associated terminal and the other laterally in the opposite direction against its associated terminal.

6. The method of securing a component in affixed relationship against one side of a wiring panel comprising applying said component against said face with wires extending from said component through said panel and beyond its opposite face, and crimping said wires laterally in opposite directions to effect the desired affixed relationship.

References Cited in the file of this patent

UNITED STATES PATENTS

2,746,041 Heeley ---------------- May 22, 1956

UNITED STATES PATENT OFFICE
CERTIFICATE OF CORRECTION

Patent No. 2,893,006 July 7, 1959

Walter Stuhre

It is hereby certified that error appears in the printed specification of the above numbered patent requiring correction and that the said Letters Patent should read as corrected below.

Column 1, line 33, strike out "with such firmness as is desired for successful soldering," and insert the same after "affixed" in line 34, same column.

Signed and sealed this 17th day of November 1959.

(SEAL)
Attest:

KARL H. AXLINE
Attesting Officer

ROBERT C. WATSON
Commissioner of Patents